United States Patent [19]
Scheidt

[11] 3,815,583  
[45] June 11, 1974

[54] PULSE MONITORING SYSTEM

[76] Inventor: Thomas R. Scheidt, 6302 W. 79th St., Indianapolis, Ind. 46278

[22] Filed: Jan. 19, 1972

[21] Appl. No.: 219,074

[52] U.S. Cl....... 128/2.05 P, 128/2.06 F, 128/2.1 A
[51] Int. Cl............................................. A61b 5/02
[58] Field of Search...... 128/2.05 R, 2.05 P, 2.06 F, 128/2.06 R, 2 A, 2.1 A

[56] References Cited
UNITED STATES PATENTS

| | | | |
|---|---|---|---|
| 3,192,921 | 7/1965 | Erickson et al. | 128/2.05 R |
| 3,199,508 | 8/1965 | Roth | 128/2.06 R |
| 3,412,729 | 11/1968 | Smith, Jr. | 128/2 L |
| 3,513,833 | 5/1970 | Finch et al. | 128/2.06 R |
| 3,517,662 | 6/1970 | Finch et al. | 128/2.06 B |
| 3,548,807 | 12/1970 | Crovella | 128/2.06 R |
| 3,572,316 | 3/1971 | Vogelman et al. | 128/2.05 R |
| 3,618,592 | 11/1971 | Stewart | 128/2.05 R |
| 3,638,640 | 2/1972 | Shaw | 128/2 L |

FOREIGN PATENTS OR APPLICATIONS

| | | | |
|---|---|---|---|
| 1,918,736 | 10/1969 | Germany | 128/2.05 R |

Primary Examiner—Kyle L. Howell
Attorney, Agent, or Firm—Woodard, Weikart, Emhardt & Naughton

[57] ABSTRACT

A system for automatically monitoring the heart pulse rates of patients. Each patient is provided with a holder mounted to the patient's ear having a light emitting diode which transmits light through the ear lobe to a light sensitive transistor. A transmitter located in the holder transmits the electrical signal received by the transistor as the light is pulsed by blood flowing through the lobe. Receivers are provided to pick up the electrical pulse signals of the transmitters. Heart failure detectors are connected to the receivers and determine when the electrical pulse signals or heart pulse rates exceed an upper preset limit or a lower preset limit. A visual and audio alarm is provided to indicate when the heart pulse rates exceed the preset limits. A clock is provided which automatically measures the expiration of time from the initiation of the alarm. The system includes a pulse monitor which allows the operator to select a given patient and determine the exact pulse rate of the patient.

5 Claims, 6 Drawing Figures

PULSE MONITORING SYSTEM

BACKGROUND OF THE INVENTION

1. Field of the Invention

This invention is in the field of heart pulse rate monitoring and display systems.

2. Description of the Prior Art

A representative sample of the prior art is disclosed in the following U. S. Pat. Nos. 3,199,508 issued to N. A. Roth; 3,513,833 to H. T. Finch, et at.; 3,517,662 to H. T. Finch, et al.; and, 3,548,807 to Edward A. Crovella.

The pulse monitoring system disclosed herein is comprised of a photoelectric absorption device attached to an extremity, such as an ear lobe of a patient, wire-coupled to a radio transmitter which is also attached to the patient such as in the auditory canal, a radio receiver, a heart failure detector and alarm, the latter three of which may be retained by the patient and thereby provide intelligence of his heart pulse rate to him, or these latter three units may be remotely located at a central control station for automatic or manual monitoring there. Whether used singly or in multiplicity each heart failure detector will continuously sense the heart pulse rate of the corresponding patient until either the present upper or lower bound of heart pulse rate is exceeded, at which time an audible sound alarm is energized. If the central control station method is used the radio transmitters at the outlying stations are linked to the radio receivers at the central control station by radio wave transmission. Further the radio receivers are keyed to a rotary switch such that when the audible sound alarm is energized for a particular outlying station a light emitting diode corresponding to this station is energized identifying that station and, simultaneously, a timer is energized thus measuring time elapsed since the heart pulse rate exceeded a preset bound. This elapsed time value is indicated on a light emitting diode alphanumeric display. If desired, the energized alarm circuit can be isolated by a switching arrangement and the remaining radio receivers (heart failure detectors) can be automatically monitored each continuously through the use of an auxiliary alarm unit. An alarm unit will also be energized in case of component failure or dislodgement of the photoelectric absorption device from its initial location, however, any heart failure detector can be removed from monitoring by a switching device at the central control station. Any outlying station can be manually monitored and the heart pulse rate can be so measured by setting the rotary switch to the desired location and engaging a pushbutton switch. As long as the pushbutton switch remains engaged, the elapsed time and the number of heart beat pulses are measured and displayed alphanumerically by light emitting diodes. During the manual monitoring interval the auto-matic monitoring of all outlying stations continues.

SUMMARY OF THE INVENTION

One embodiment of the present invention is a system for monitoring the heart beat pulse of patients comprising sources of light mountable to the bodies of the patients for directing light therethrough, light sensitive means mountable to the bodies to receive the light subsequent to the light passing through the bodies and being operable to produce pulsing electrical signals in response to the light being pulsed by blood flowing through the bodies, radio transmitters connected to said light sensitive means to transmit the signals, radio receivers to receive the signals from the radio transmitters, detector means connected to the receivers and being operable to continuously detect and immediately produce a detection signal when any of the electrical signals first become out of ranges having preset upper limits and preset lower limits, pulse display means connected to the detector means and being operable to display the heart beat pulse rate corresponding to any of the electrical signals, and selector means connected to the display means and detector means and being operable to apply any one of the electrical signals to the display means.

It is an object of the present invention to provide a new and improved heart pulse rate monitoring system.

It is the further object of the present invention to provide a system for remotely monitoring simultaneously the range of individual heart pulse rates while also allowing the specific determination of a given patient's pulse rate.

Related objects and advantages of the present invention will be apparent from the following description.

DESCRIPTION OF THE PREFERRED EMBODIMENT

Figure 1:
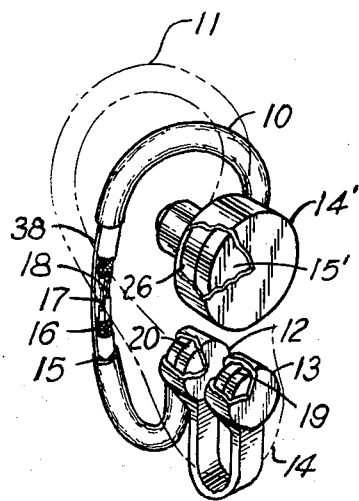
FIG. 1 is a perspective view of an ear piece used with the present invention shown mounted to a person's ear.

For the purposes of promoting an understanding of the principles of the invention, reference will now be made to the emobidment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown an ear piece 10 mounted to a person's ear 11. Ear piece 10 has a pair of spaced apart walls 12 and 13 which fit snugly on the lobe portion 14 of the ear. Walls 12 and 13 are connected together and are connected to enclosure 14' by a hollow casing 15. Walls 12 and 13 as well as casing 15 and enclosure 14' may be produced from a material such as plastic. Within wall 12 is mounted a photosensitive transistor 20. A light emitting diode 19 is mounted in wall 13 and is arranged so as to direct monochromatic light through lobe 14 towards the transistor 20. Thus, as blood is pumped through lobe 14, the light from diode 19 which passes through the lobe towards transistor 20 will be reduced. Likewise, as blood is not pumped through lobe 14, a relatively larger amount of light will pass through the lobe from the diode to the transistor. Thus, as blood is cyclically pumped through the lobe, the light passing through the lobe will be pulsed and an electrical signal will appear at the output of transistor 20. An accurate count of the person's pulse is thereby achieved. Diode 19 and transistor 20 are connected via electrical shield wire 16 and wires 17 and 18 within casing 15 to a transmitter 15' and battery 26 positioned within enclosure 14'. Enclosure 14' is of suitable size so as to place within the auditory canal of the ear. A wire antenna 38 within casing 15 is connected to transmitter 15'.

Figure 3:
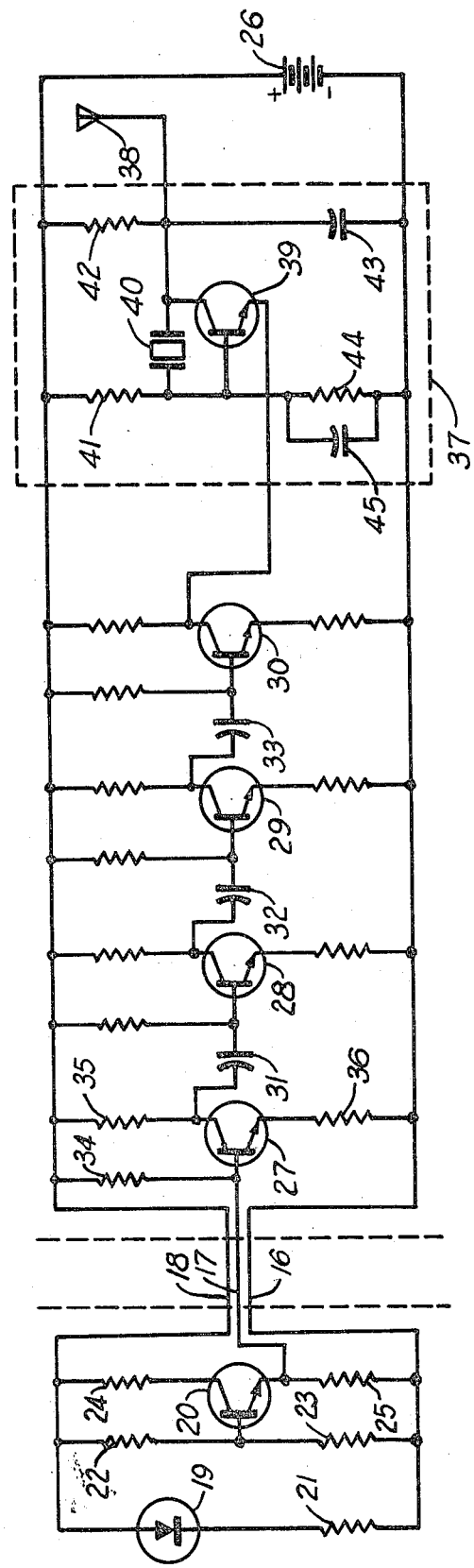
FIG. 3 is an electrical schematic of the circuitry within the ear piece of FIG. 1.

FIG. 3 is an electrical schematic of the light emitting diode, the photosensitive transistor and the transmitter which are mounted within ear piece 10. Light emitting diode 19 is connected by wires 16 and 18 to a suitable source of electrical energy such as a 3 volt battery 26. Resistor 21 is connected between the diode and the battery to limit the amount of current through the diode so as to prevent the operating specifications of the diode from becoming exceeded. Resistors 22, 23, 24 and 25 serve as biasing resistors for photosensitive transistor 20. Resistor 25 also provides a suitable pick-off voltage for obtainment of the pulsing electrical signal. Resistors 22 and 23 provide a constant base voltage to transistor 20 allowing for greater sensitivity. A decrease in light intensity from diode 19 as seen by the photosensitive transistor 20, such as when light of certain wave length bands is absorbed by constitutents of the pulsing blood, causes a decrease in the conductivity of transistor 20 and a resulting decrease of the emitter voltage of the transistor on line 17 with respect to the voltage return line 16.

The voltage change resulting from the photosensitive transistor 20 is applied across lines 17 and 16 and is successively amplified and inverted by transistors 27, 28, 29 and 30. The base of transistor 27 is connected directly to the emitter of transistor 20 with the bases of the remaining transistors being connected to the collector of the preceding transistor. Coupling capacitors 31, 32 and 33 connect the collector of the preceding transistor with the base of the next transistor thereby transfering the output signal of one transistor to the next transistor. Each transistor is provided with proper biasing resistors. For example, transistor 27 is provided with biasing resistors 34, 35 and 36 which are connected respectively to the base, collector and emitter of the transistor. Present at the collector of transistor 30 is the noninverted original signal present at the emitter of transistor 20 with the exception that the signal has been amplified. The amplified signal is then fed from the collector of transistor 30 to an oscillator 37 and then transmitted via antenna 38 to the central receiver or receivers. The amplified signal present at the collector of transistor 30 is noninverted with respect to the emitter of transistor 20 and is fed to the emitter of transistor 39 of oscillator 37. The amplified pulse signal at the collector of transistor 30 is modulated by transistor 39 on the frequency of crystal 40 and then transmitted from antenna 38. Capacitors 43 and 45 are selected according to their relative reactances to control the amount of feed back from the collector to the base of transistor 39 and thereby control the excitation level of the transistor. Oscillator 37 is commonly known as a Pierce Crystal Oscillator. Resistors 41, 42 and 44 are provided to properly bias transistor 39. As previously discussed, an increase of blood pumped through the ear lobe will result in a voltage decrease present at the emitter of transistor 20 which is successively amplified and inverted by transistors 27 through 30. The amplified voltage decrease signal present at the collector of transistor 30 is then fed through transistor 39 such that a heart pulse in reducing the light seen by transistor 20 is transformed to an increase voltage at the collector of transistor 39.

Figure 2:
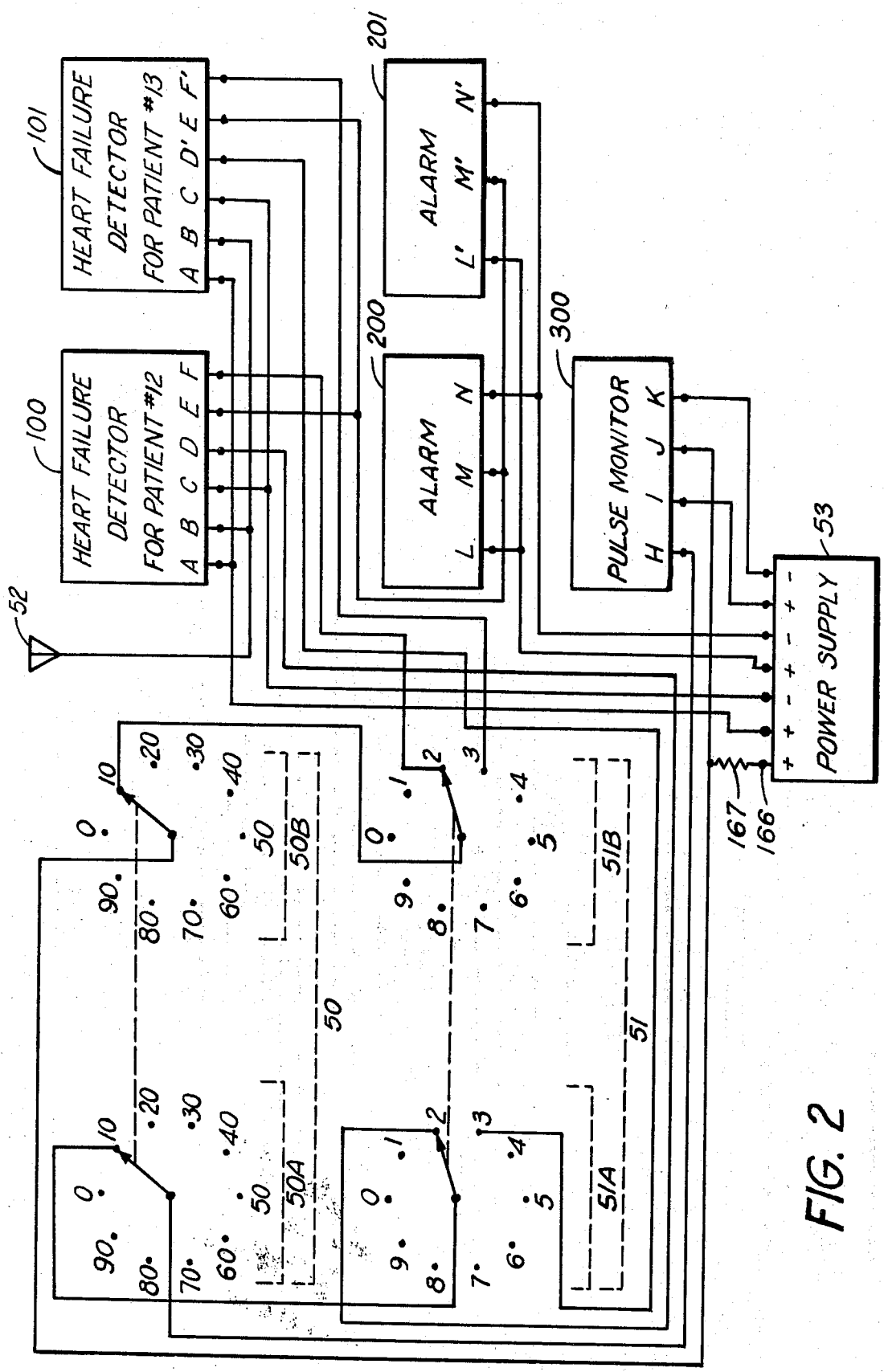
FIG. 2 is a block diagram of the electrical circuitry incorporating the present invention.

Referring to FIG. 2, the pulse signal transmitted by the ear piece is received by antenna 52 and conveyed to the appropriate heart failure detector. The signal may be amplified as required between antenna 52 and the detectors. The number of heart failure detectors utilized will depend upon the number of patients being monitored. For example, if two patients are being monitored, then two heart failure detectors are required as shown in FIG. 2. Additional heart failure detectors may be connected as shown for the connections between detectors 100 and 101. That is, common terminals A are interconnected, terminals B are interconnected, terminals C are interconnected and terminals E are interconnected. Terminals D and F as well as D' and F' are connected to the suitable contacts of rotary switch 51. In the embodiment shown in FIG. 2, a pair of rotary switches 50 and 51 are provided for connecting the pulse monitor 300 to detectors 100 and 101. The movable wipers of decks 50A and 50B of rotary switch 50 are mechanically connected together. Likewise, the movable wipers of decks 51A and 51B of rotary switch 51 are mechanically connected together. As previously discussed, each heart failure detector whether used singly or in multiplicity will continuously sense the heart pulse rate of the corresponding patient until either the preset upper or lower bound of heart pulse rate is exceeded at which time a detection signal is produced and an audible alarm is energized. During the continuous monitoring of all patients, the operator at the central control station may monitor the specific pulse of a specific patient. Thus, the operator will be able to tell whether the pulses of a plurality of patients are exceeding preset upper and lower limits while simultaneously being able to read the specific pulse of a particular patient.

Figure 4:
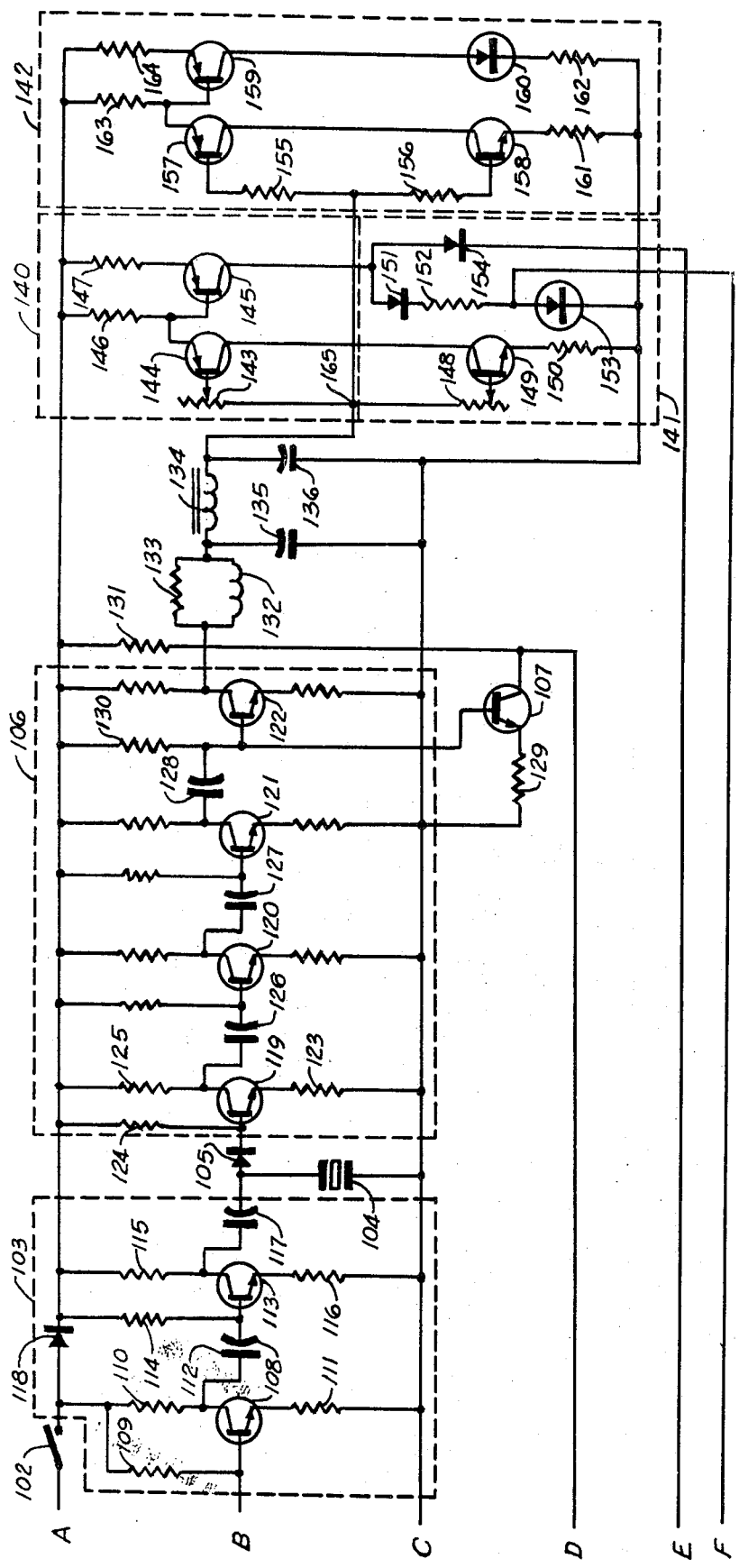
FIG. 4 is a electrical schematic of the circuitry within one of the heart failure detectors of FIG. 2.

Heart failure detector 100 will now be described it being understood that an identical description applies to detector 101 and for the other detectors not shown in FIG. 2. Detector 100 has an input power terminal A connected to a positive terminal of power supply 53. Power supply 53 is a standard regulated power supply having a direct current output and an alternating current input. In addition, the power supply is provided with a battery capability in case of regular power failure and also to provide for the portability of the system. Terminal C of detector 100 is connected to one of the negative terminals of power supply 53. The pulse signal received by antenna 52 from the transmitter of the ear piece corresponding to detector 100 is fed into terminal B of detector 100. Terminal E of detector 100 is connected to alarm 200 whereas terminals D and F of detector 100 are connected to the appropriate fixed contacts respectively of decks 51A and 51B of pulse monitoring rotary switch 51. Detector 100 is provided with an on/off switch 102 (FIG. 4) which when closed provides the voltage required to operate the detector.

The incoming signal from antenna 52 is fed into terminal B of detector 100 and amplified by a two stage amplifier 103. The amplified signal is then demodulated by crystal 104 and diode 105 with the demodulated signal then being amplified by a four stage amplifier 106. An amplified demodulated signal is fed from amplifier 106 to the base of a power amplifier 107 which has its emitter and collector connected to the negative and positive terminals of power supply 53 via terminals C and A. The signals fed into the base of transistor 107 thereby pulse the transistor with the pulse signal from the collector of transistor 107 being fed via terminal D and rotary switches 51 and 50 to pulse monitor 300 for counting heart pulse beats.

Amplifier 103 includes transistor 108 with three biasing resistors 109 through 111. The incoming signal from the antenna is fed into the base of transistor 108 being amplified and inverted. The amplified and inverted signal at the collector of transistor 108 is then fed across coupling capacitor 112 to the base of a second transistor 113 which is provided with biasing resistors 114 through 116. Transistor 113 amplifies and inverts the base signal which is then taken from the collector of transistor 113 across coupling capacitor 117. At this point, crystal 104 resonates at a preselected frequency allowing only a predetermined frequency band to pass from amplifier 103 to diode 105 for demodulation. Diode 118 prevents the demodulated signal from feeding back to the other heart failure detectors. The top half portion of the demodulated signal is then amplified and inverted by successive stages of amplifier 106.

Amplifier 106 is provided with four transistors 119 through 122 each of which is provided with appropriate biasing resistors. For example, transistor 119 is provided with biasing resistors 123 through 125. Transistor 120 is coupled to transistor 119 and 121 respectively by coupling capacitors 126 and 127 whereas transistor 121 is coupled via capacitor 128 to transistor 122. The input to the base of transistor 122 is also fed to the base of transistor 107. Transistor 107 with associated biasing resistors 129, 130 and 131 amplifies and inverts the signal with the resulting signal at the collector of transistor 107 being fed to terminal D for counting heart pulse beats.

The amplified demodulated signal present at the collector of transistor 122 is fed across inductor 132 and resistor 133 connected in parallel and capacitor 135 which provide an increase in the voltage with an increase in the frequency of the signal. Inductor 134 with capacitors 135 and 137 represents a pi-filter which filters out of high frequency components of the signal leaving a DC voltage signal and a relatively small AC voltage component. This signal is then fed into a high limit subcircuit 140 and a low limit subcircuit 141 which respectively establishes the upper and lower bounds of acceptable heart pulse rates. In the event that the heart pulse rate exceeds the limits established by subcircuits 140 and 141, then a signal is provided through terminal E to alarm 200 (FIG. 2).

Each subcircuit 140 and 141 includes a variable resistor connected to inductor 134 for establishing the upper and lower limits of the heart pulse rate range. Variable resistor 143 is connected to the base of transistor 144 which has its collector connected to the collector of transistor 149. The base of transistor 149 is connected to variable resistor 148 also connected to inductor 134. Variable resistor 143 is preset for the upper bound of acceptable heart pulse rate and further serves as a biasing resistor as does resistor 146 for transistor 144. Variable resistor 148 is similarly preset for the lower bound of acceptable heart pulse rate and also serves as a biasing resistor as does resistor 150 for transistor 149. When the heart pulse rate is within the preset bounds, transistors 144 and 149 are conductive and transistor 145 is not conductive. When the preset upper heart pulse rate bound is exceeded, transistor 144 becomes less conductive and transistor 149 becomes more conductive but experiences a lesser change in conductivity than does transistor 144. This causes a decrease in the voltage at the emitter of transistor 144 which is connected directly to the base of transistor 145. The decrease of the base voltage of transistor 145 with respect to terminal C thereby provides a higher voltage across the emitter and base of transistor 145 causing transistor 145 to become conductive thus allowing current to flow through diode 151, through voltage dropping resistor 152 and through light emitting diode 153 which serves as an indicator light. Transistor 145 has a control path connected to the emitter of transistor 144 and a load path connected to terminals A and E. Simultaneously, current also flows through diode 154 which is connected between the collector of transistor 145 and terminal E which in turn is connected to terminal M of alarm 200. The current flowing through diode 154 and terminal E to the alarm thereby actuates the audio alarm to be described later. Resistors 146 and 147 are biasing resistors for transistor 145.

The visual indication of diode 153 and the audio alarm triggered by the current flowing through diode 154 occurs whenever the preset upper and lower heart pulse rate bound is exceeded. When the preset lower heart pulse rate bound is exceeded at junction point 165, transistor 144 becomes more conductive and transistor 149 becomes less conductive. Transistor 149 experiences a greater change in conductivity than does transistor 144 resulting in a decrease in the base voltage at transistor 145 with respect to terminal C which again acts in a similar manner to actuate diode indicator 153 and the audio alarm connected to terminal E.

A system failure subcircuit 142 is connected to junction 165. Subcircuit 142 is similar to subcircuits 140 and 141 and includes a pair of transistors 157 and 158 having their collectors connected together with the transistor bases being connected through current limiting resistors 155 and 156 to junction 165. A large change in voltage at junction 165 such as due to component failure or dislodgement of the ear piece from the ear, is applied to the bases of transistors 157 and 158 causing a voltage change at the emitter of transistor 157 which is connected directly to the base of transistor 159. Transistor 159 is thereby activated causing current flow through light emitting diode indicator 160. Simultaneously, diode indicator 153 will be activated along with diode indicator 160 thereby providing an indication that a system failure has occurred as contrasted to the exceeding of the heart pulse rate of the upper and lower preset levels. In the event that diode indicator 153 lights and diode indicator 160 does not light then the operator will immediately know that the heart pulse rate has exceeded the preset upper or lower levels. Resistors 163 and 161 are respectively biasing resistors for the transistors 157 and 158 whereas resistors 163 and 164 are biasing resistors for transistor 159. Resistor 162 limits the maximum current flow through diode indicator 160.

The pulse rate of each patient will be continuously monitored to determine if each rate exceeds the upper and lower limits preset for each patient regardless of the posi-tion of rotary switches 50 and 51. By positioning rotary switches 50 and 51, the operator will be able to specifically determine the pulse rate of a given patient. Referring to FIG. 2, heart failure detector 100 is identified as the detector for patient 12 whereas detector 101 is identified as the detector for patient 13. To specifically determine the pulse rate of patient 12, switch 50 is set so that the movable wiper is adjacent to fixed contact identified by the number 10. In addition, rotary switch 51 is set so that the movable wiper is positioned adjacent to the fixed contact identified by the number 2. Thus, terminal D of detector 100 is connected through deck 51A and deck 50A to terminal H of pulse monitor 300 whereas terminal F of detector 100 is con-nected through decks 51B and 50B to terminal J of pulse monitor 300. During manual monitoring, the applied voltage from terminal 166 (FIG. 2) to terminal F will actuate light emitting diode 153 (FIG. 4) with diode 151 serving to prevent current flowing back into transistor 145 or through diode 154. Diode 154 also prevents current from other heart failure detectors from flowing through terminal E and falsely actuating diodes 153.

Figure 5:
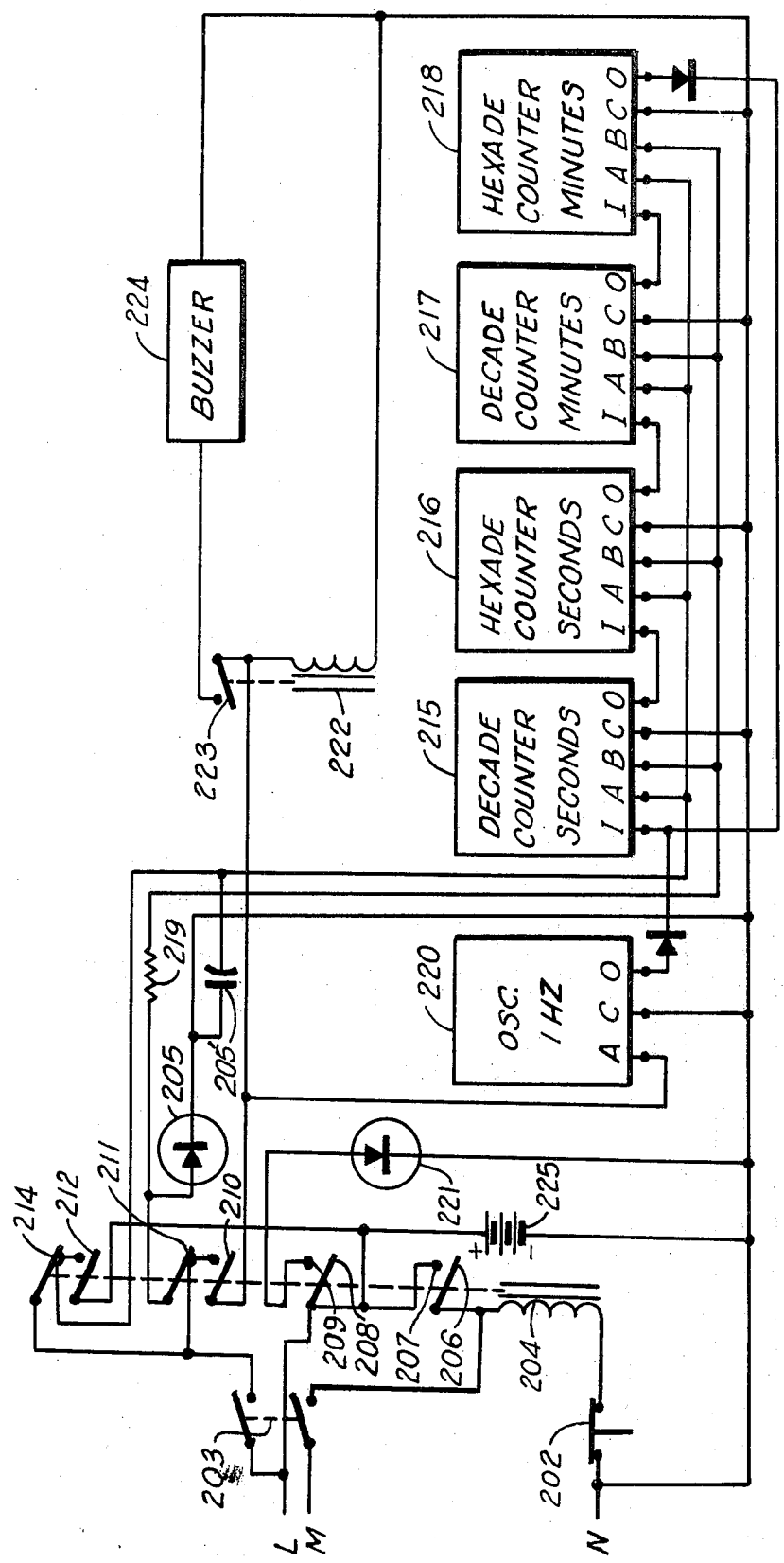
FIG. 5 is an electrical schematic of the circuitry within one of the alarms of FIG. 2.

Several alarm units may be connected to the central control station in parallel. Alarm unit 200 will now be described it being understood that a similar description applies to alarm unit 201. The L and N terminals of alarm unit 200 are connected to a positive and negative terminal of power supply 53 whereas terminal M is connected to terminal E of the heart failure detector to receive the signal from transistor 145 which indicates that the pulse rate has exceeded the upper or lower preset limits. Referring to FIG. 5, a normally closed pushbutton switch 202 is provided in the line connected to terminal N for interrupting the flow of power to the alarm thereby deactivating the alarm when desired. By closing manual switch 203, power is applied to the contacts of relay 204. The coil of the relay is connected across terminals N and M and is actuated when switch 202 is closed. A light emitting diode indicator 205 is connected to normally closed contact 211 and to the negative terminal N. Thus, when switch 203 is closed, diode 205 will light indicating that the alarm module is operative. Conventional decade and hexade counters are provided for counting the seconds and minutes which expire subsequent to the receipt of the alarm signal on terminal M. Thus, the elapsed time since the heart pulse rate exceeded the upper and lower preset limits may be determined. The counters are provided with visual indicators to allow the easy identification of the time. Such counters are quite standard and thus, this specification will not elaborate thereon. Needless to say, these counters 215, 216, 217, and 218 are provided with a reset terminal B which are connected via current limiting resistor 219 to the normally closed contact 211. Thus, when switch 203 is closed, a reset signal is sent via contact 211 and resistor 219 to terminal B of the counters causing the counters to zero. Capacitor 205' provides a constant source of power to counters 215 through 218 during the brief duration of switching of relay 204.

A 1 hz square wave standard oscillator 220 is connected between the negative terminal N and the positive terminal L. Thus, when relay 204 activates, the normally open contact 210 will close thereby routing power to the oscillator which in turn feeds time data from its terminals C and O to counters 215 and 218. When the alarm signal is received on terminal M, relay 204 actuates and light emitting diode 221 receives power through closed contacts 206 and 207, and closed contacts 208 and 209. Simultaneously, oscillator 220 is actuated through contact 210, contact 211 opens and contact 214 opens thereby allowing the counters to start. When contact 211 opens, the zeroing signal to the counters is removed and diode 205 turns off. When contact 214 opens, power to operate the counters is provided by battery 225. In addition, relay 222 is actuated since contact 210 closes and thus the normally open contact 223 of relay 222 closed connecting buzzer 224 via closed contact 210 to the power supply providing for an audio warning. Relay 222 may be a time delay relay which will automatically open its contacts after being activated subsequent to a given time period. Thus, the buzzer will automatically be disconnected. Also, switch 203 may be opened causing the buzzer to silence if it has not already been silenced automatically and also causing the oscillator to be disconnected with the time remaining displayed. A suitable sized battery 225 is connected between terminals L and N for recharging and to normally open contacts 212 and 213 to provide the required DC power to counters 215 thru 218. Opening switch 202 causes the alarm circuit to return to its original state.

Figure 6:
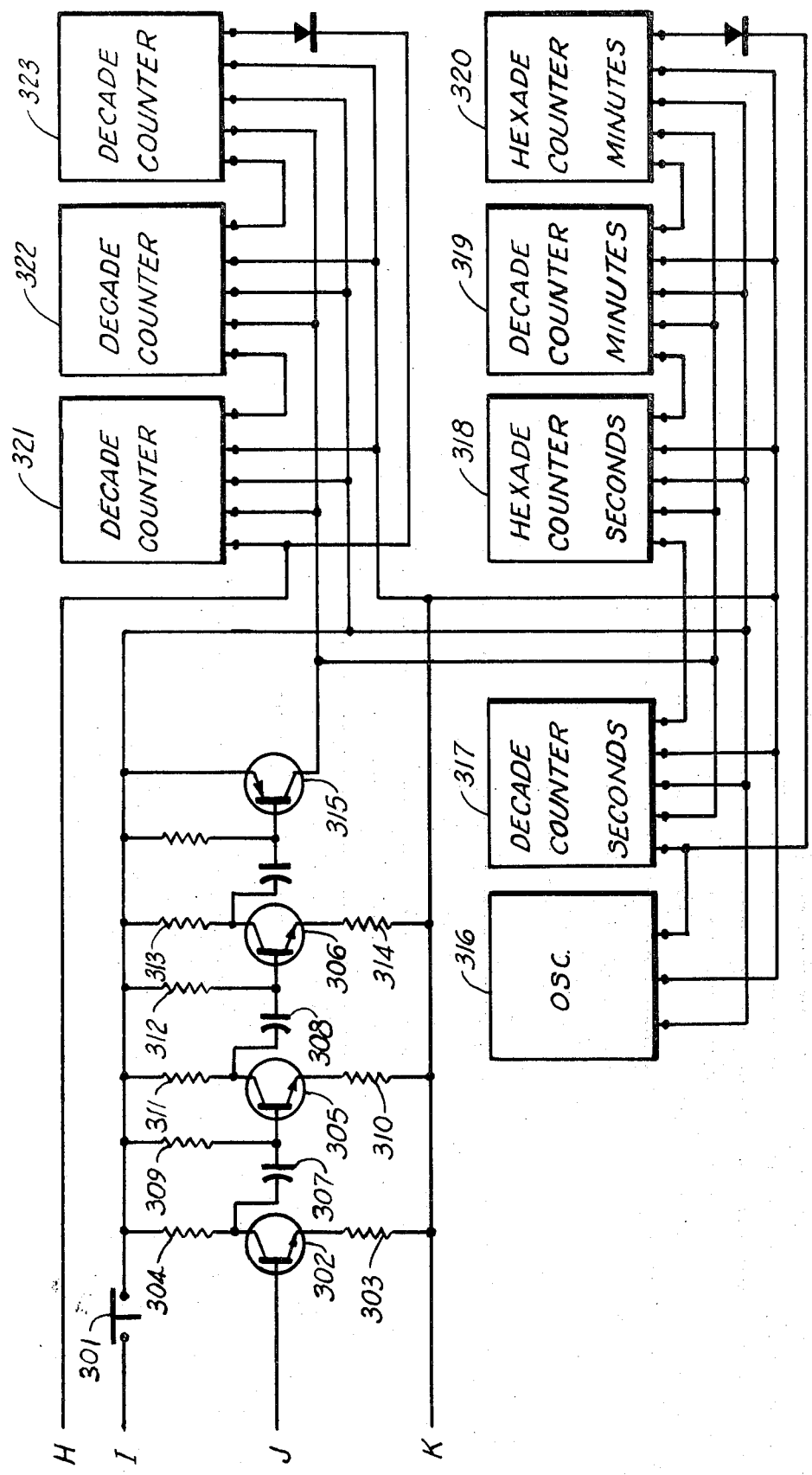
FIG. 6 is an electrical schematic of the circuitry within the pulse monitor of FIG. 2.

Only a single pulse monitor 300 is required for the system shown in FIG. 2. By turning rotary switches 50 and 51, the operator has the capability of selecting a particular outlying patient, starting the simultaneous count of heart pulse beats and elapsed time in seconds and minutes which are continuously displayed by pulse monitor 300 and automatically reset to zero whenever the pulse monitoring rotary switches 50 and 51 are reset to another patient location. Terminals I and K of pulse monitor 300 are connected to positive and negative terminals of power supply 53 whereas terminal H carries the selected heart pulse signal and terminal J is connected to the rotary switch wiper of decks 50B and 51B. When a pulse is to be monitored, switch 301 (FIG. 6) is closed thus applying power from terminal I to the pulse monitor. A patient is then selected by positioning rotary switches 50 and 51. When the movable wiper of deck 51B is moved from a position corresponding to one patient to the position corresponding to the patient whose heart pulse beat is desired to be measured, the contact between the movable wiper and the fixed contact of deck 51B will temporarily be interrupted causing the voltage at terminal J of the pule monitor to increase. Terminal J is connected to positive terminal 166 of power supply 53 with a resistor 167 being provided between terminal 166 and terminal J. The signal present at terminal J is successively amplified and inverted by transistor 302 whose base is connected directly to terminal J, and by transistors 305 and 306. The collector of transistor 302 is coupled by capacitor 307 to the base of transistor 305 whereas the collector of transistor 305 is connected via capacitor 308 to the base of transistor 306. Each transistor is provided with suitable biasing resistors. For example, transistor 302 is provided with biasing resistors 304 and 303 whereas transistor 305 is provided with biasing resistors 309, 310 and 311. Resistors 312 through 314 bias transistor 306. The amplified signal present at the collector of transistor 306 is fed to the base of transistor 315 causing transistor 315 to become nonconductive thus cutting off the reset signal to pulse counters 321 through 323 and time counters 317 through 320. The heart pulse signal present at terminal H is then counted and displayed simultaneously with the time pulse emitted from oscillator 316. Decade counters 321, 322 and 323 count the heart pulse rate from terminal H whereas counters 317 through 320 count the time being sequenced and connected to oscillator 316.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

The invention claimed is:

1. A system for monitoring the body functions of a patient's body comprising:
   a first wall and a second wall connected together but spaced apart with a portion of said body adapted to extend therebetween;
   a source of light mounted on said first wall for directing light through said body;
   light sensitive means mounted on said second wall and aligned with said source of light to receive said light sub-sequent to said light passing through said body, said means being operable to produce pulsing electrical signals in response to said light being pulsed by blood flowing through said body;
   a radio transmitter connected to said light sensitive means to transmit said signals;
   a radio receiver to receive said signals from said radio transmitter;
   detector means connected to said receiver and being operable to continuously detect and immediately produce a detection signal when any of said electrical signals first become out of a range having a preset upper limit and preset lower limit; and,
   display means connected to said detector means and being operable to display blood data corresponding to any of said electrical signals;
   alarm means connected to said detector means and being operable to produce a warning signal upon receipt of said detection signal;
   said detector means includes two common collector transistors with emitters connected across a source of electrical energy and two variable resistors connected together to receive said electrical signals, said variable resistors being connected to the bases of said transistors, said detector means further includes a transistor with a control path connected to the emitter of one of said transistors and a load path connected at one end to said source of electrical energy and at the other end to said alarm means.

2. The system of claim 1 wherein:
   said alarm means includes a first and second relay and an audio alarm, said first relay has control means operably connected to said load path of said detector means and to a supply of electrical energy, said first relay having normally opened contacts connected to said supply, said second relay has control means connected to said supply and one of said normally opened contacts, said audio alarm is connected to said supply and the normally opened contacts of said second relay.

3. A system for monitoring the body functions of a patient's body comprising:
   a first wall and a second wall connected together but spaced apart with a portion of said body adapted to extend therebetween;
   a source of light mounted on said first wall for directing light through said body;
   light sensitive means mounted on said second wall and aligned with said source of light to receive said light subsequent to said light passing through said body, said means being operable to produce pulsing electrical signals in response to said light being pulsed by blood flowing through said body;
   a radio transmitter connected to said light sensitive means to transmit said signals;
   a radio receiver to receive said signals from said radio transmitter;
   detector means connected to said receiver and being operable to continuously detect and immediately produce a detection signal when any of said electrical signals first become out of a range having a preset upper limit and preset lower limit; and,
   display means connected to said detector means and being operable to display blood data corresponding to any of said electrical signals;
   said source of light is a light emitting diode which emits monochromatic light and said light sensitive means is a photosensitive transistor;
   a holder mountable to an ear of said patient including said first wall and said second wall positionable on either side of the ear lobe with said diode mounted in said first wall and with said transistor mounted in said second wall, said diode is arranged to direct light through said lobe to said transistor, said holder includes a casing fittable into the auditory ear canal with said transmitter mounted to said casing, said holder further includes a hollow tube connecting said wall to said casing, said tube has wires electrically connecting said transmitter to the diode and transistor.

4. A system for monitoring the body functions of a patient's body comprising:
   a first wall and a second wall connected together but spaced apart with a portion of said body adapted to extend therebetween;
   a source of light mounted on said first wall for directing light through said body;
   light sensitive means mounted on said second wall and aligned with said source of light to receive said light subsequent to said light passing through said body, said means being operable to produce pulsing electrical signals in response to said light being pulsed by blood flowing through said body;
   a radio transmitter connected to said light sensitive means to transmit said signals;
   a radio receiver to receive said signals from said radio transmitter;
   detector means connected to said receiver and being operable to continuously detect and immediately produce a detection signal when any of said electrical signals first become out of a range having a preset upper limit and preset lower limit; and, display means connected to said detector means and being operable to display blood data corresponding to any of said electrical signals;

said source of light, said light sensitive means, and said radio transmitter are mounted in an earpiece having no external electrical connections.

5. A system for monitoring the body functions of a patient's body comprising:

a first wall and a second wall connected together but spaced apart with a portion of said body adapted to extend therebetween;

a source of light mounted on said first wall for directing light through said body;

light sensitive means mounted on said second wall and aligned with said source of light to receive said light sub-sequent to said light passing through said body, said means being operable to produce pulsing electrical signals in response to said light being pulsed by blood flowing through said body;

a radio transmitter connected to said light sensitive means to transmit said signals;

a radio receiver to receive said signals from said radio transmitter;

detector means connected to said receiver and being operable to continuously detect and immediately produce a detection signal when any of said electrical signals first become out of a range having a preset upper limit and preset lower limit; and, display means connected to said detector means and being operable to display blood data corresponding to any of said electrical signals;

a pulse monitor and selector means connected to said detector means for applying the electrical signals of said detector means to said pulse monitor;

said pulse monitor includes means for displaying a heart pulse rate corresponding to said electrical signals.

* * * * *